(12) United States Patent
Schaupp et al.

(10) Patent No.: US 7,080,963 B2
(45) Date of Patent: Jul. 25, 2006

(54) MILLING TOOL HAVING AN ADJUSTABLE INSERT SEAT

(75) Inventors: Berthold Schaupp, Dettenhausen (DE); Thomas Schneider, Hirrlingen (DE)

(73) Assignee: Walter Ag, Tubingen (DE)

( * ) Notice: Subject to any disclaimer, the term of this patent is extended or adjusted under 35 U.S.C. 154(b) by 0 days.

(21) Appl. No.: 10/921,891

(22) Filed: Aug. 20, 2004

(65) Prior Publication Data

US 2005/0047876 A1 Mar. 3, 2005

(30) Foreign Application Priority Data

Sep. 3, 2003 (DE) ................. 103 40 493

(51) Int. Cl.
B23B 5/24 (2006.01)
(52) U.S. Cl. .............. 407/36; 407/45; 407/46
(58) Field of Classification Search ........... 407/36–39, 407/44–46, 48, 79, 88, 98; B23B 5/24
See application file for complete search history.

(56) References Cited

U.S. PATENT DOCUMENTS 2,037,642 A * 4/1936 Schibner ................ 407/39
3,116,538 A * 1/1964 Severson ................ 407/41
4,268,194 A * 5/1981 Bloink et al. ............ 407/22
4,627,771 A * 12/1986 Kieninger ............... 407/39
5,209,610 A 5/1993 Arai et al.
5,913,643 A * 6/1999 Fowler et al. ........... 407/36
5,957,176 A * 9/1999 Stein .................... 144/230
6,497,537 B1 * 12/2002 Francis et al. ........... 407/37

FOREIGN PATENT DOCUMENTS

| DE | 3236921 C1 | * 11/1983 |
| DE | 4403188 A1 | * 8/1995 |
| DE | 199 45 360 | 3/2001 |
| DE | 19951931 A1 | * 5/2001 |
| GB | 2103975 A | * 3/1983 |

\* cited by examiner

*Primary Examiner*—Boyer D. Ashley
*Assistant Examiner*—Sara Addisu
(74) *Attorney, Agent, or Firm*—Drinker Biddle & Reath LLP

(57) ABSTRACT

A milling tool includes insert seats in which respective cutting inserts are disposed. Positioned in each seat is a wedge plate which is adjustable relative to the tool body in a direction of wedge adjustment. A cutting insert is supported on the wedge plate and secured directly to the tool body. The wedge plate is wedge shaped such that when the wedge plate is adjusted relative to both the tool body and the cutting insert, the cutting insert is displaced in a direction perpendicular to the direction of wedge adjustment.

18 Claims, 5 Drawing Sheets

US 7,080,963 B2

MILLING TOOL HAVING AN ADJUSTABLE INSERT SEAT

Figure 1:
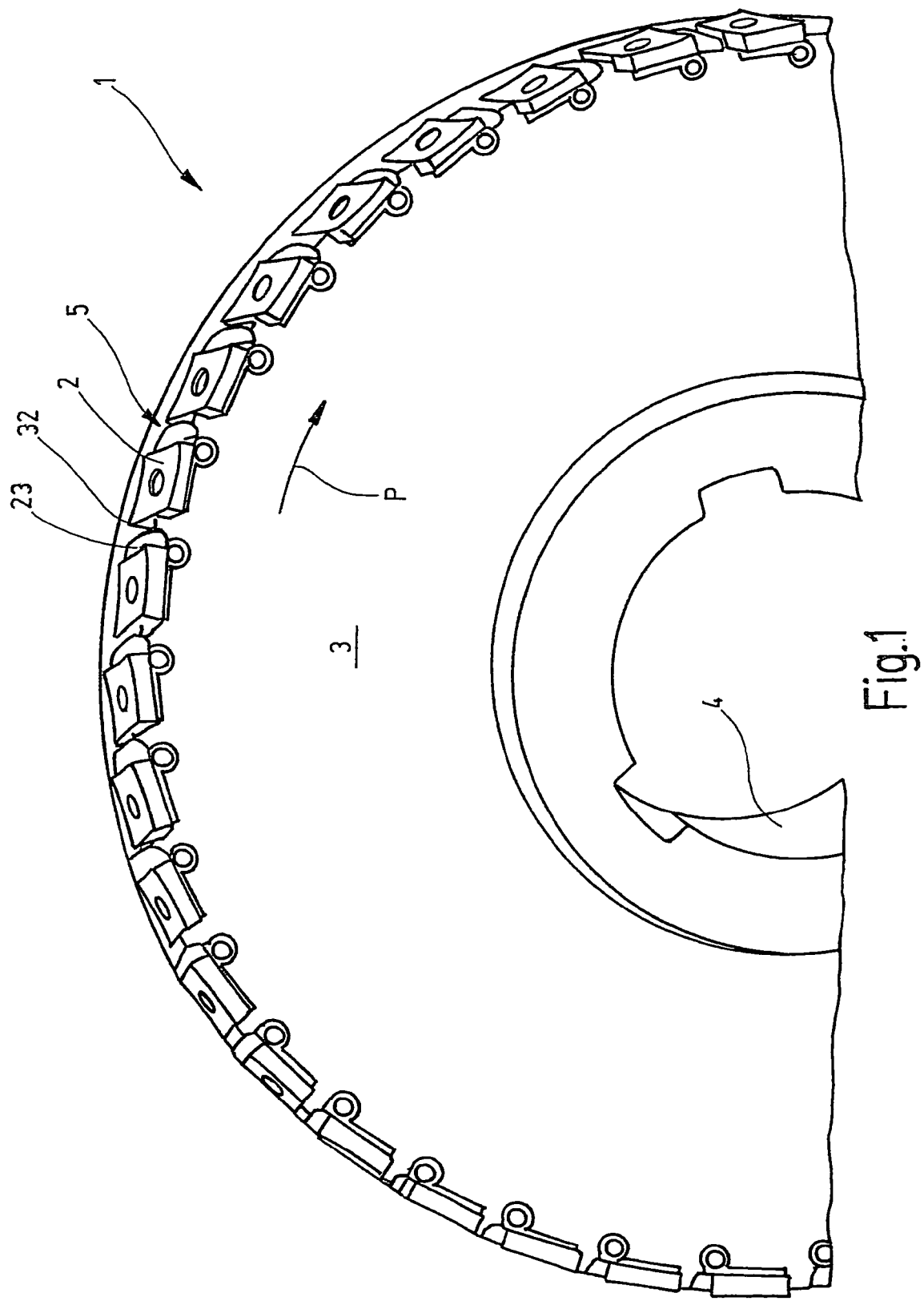

This application is based on and claims priority under 37 U.S.C. § 119 with respect to Patent Application No. 103 40 493.7 filed in Germany on Sep. 3, 2003, the entire content of which is incorporated herein by reference.

BACKGROUND OF THE INVENTION

The invention relates to a milling tool which has at least one adjustably supported cutting insert.

In milling tools intended for performing particularly accurate machining operations, it is frequently a desideratum to adjust the position of the individual cutting inserts in such a manner that the cutting edges of a plurality of cutting inserts working on the same surface define a common plane upon rotation of the milling tool. For example, circumferentially spaced cutting edges disposed on the cylindrical outer periphery of a cylindrical miller or a disk miller should lie in the same cylindrical plane. Also, cutting edges which lie at an end face of the tool body should, as far as possible, lie in a common plane oriented perpendicular to the axis of rotation.

It is known to adjustably support cutting inserts on a tool body, for example, by means of adjustable cassettes, such as described in European Patent No. 0 499 280 B1. The adjustable cutting insert is supported in a respective, approximately square cassette. For receiving the cassette, the tool body is provided with a cassette seat having an inclined bottom surface. In case the cassette seat is arranged at an end face of a disk-shaped tool body (i.e., an end-face cassette seat), the cassette bottom is inclined toward the end face. If, however, the cassette seat is arranged at the outer periphery of the disk-shaped tool body (i.e., a peripheral cassette seat), the bottom of the cassette seat is inclined toward the tangent of the tool body. Shifting a cassette in an end-face cassette seat thus results in an axial adjustment of the cutting insert, whereas shifting a cassette in a peripheral cassette seat results in a radial adjustment of the cutting insert. The cassette is secured to the tool body by a fastening screw which may be released as required. A cassette shift is effected by a wedge which is pressed against a terminus of the cassette and is actuated by its own setscrew.

Cassettes have a substantial spatial requirement, as a result of which a minimum distance must be observed between consecutive cutting inserts. Such a requirement limits the number of teeth.

A large number of teeth is a significant consideration in developing efficient chip-breaking tools. On the other hand, a high machining precision is sought after, particularly as concerns surfaces which are exposed to finish-machining during the milling process. Also, as concerns a uniform wear of the cutting inserts and the cutting edges, an accurate setting of those cutting edges which do not participate in the finish-machining is desired, so that, as much as possible, all participating cutting inserts remove the same chip thickness.

It is accordingly an object of the invention to provide a milling tool having a large number of teeth and further having adjustable cutting inserts.

SUMMARY OF INVENTION

The above object is achieved with a milling tool which comprises a tool body in combination with at least one cutting insert mounted thereon. The tool body defines an axis of rotation and includes at least one insert seat on which the at least one insert is mounted. The at least one insert seat includes a wedge-plate seating surface. A wedge plate is disposed in the at least one insert seat and is adjustable relative to the body in a direction of wedge adjustment. The wedge plate includes a base surface movably disposed on the wedge-plate seating surface, and an insert seating surface on which the at least one insert is supported. The base surface and the insert seating surface form an acute angle therebetween as viewed in a direction perpendicular to the direction of wedge adjustment. A setting device operably engages the wedge plate and is arranged to move the wedge plate in the direction of wedge adjustment relative to both the insert and the wedge-plate seating surface for adjusting the insert in a direction of insert adjustment oriented substantially perpendicularly to the direction of wedge adjustment.

Another aspect of the invention pertains to the milling tool independent of the cutting inserts.

The milling tool according to the invention has a tool body on which a plurality of cutting inserts are supported. The cutting inserts are mounted preferably as lateral inserts or tangential inserts, that is, their securing bore is oriented either approximately in the axial direction (lateral insert) or in the radial direction (tangential insert). A wedge plate, shiftable transversely to the securing bore, is arranged between the base surface of the cutting insert, to which the securing bore of the cutting insert is perpendicularly oriented, and a wedge plate seating surface of the tool body. By shifting the wedge plate, the distance between the base surface of the cutting insert and the wedge plate seating surface, and thus the position of the cutting edge of the cutting insert may be changed. Thus, in case of tangential inserts a radial adjustment of the cutting inserts is effected, while in case of lateral cutting inserts an axial adjustment of the cutting inserts is carried out. The change of position of the cutting insert is limited to an adjustment in the direction of the securing bore. Otherwise the cutting insert remains in place relative to the tool body.

Only a small space is needed between consecutive cutting inserts for shifting the wedge plates. Consequently, the distance between the cutting inserts may be maintained very small, resulting in a large number of teeth. Supporting the lateral surfaces of the cutting inserts may be effected directly by cleats of the tool body.

A significant advantage of a cutting edge adjustment by means of wedge plates shiftable relative to cutting inserts and the tool body resides in a repetitive accuracy, for example, in case of inverting an invertible cutting insert: The cutting insert may be released from its seat and again mounted thereon without the need for a new adjustment. In case of sufficiently accurately manufactured cutting inserts even a replacement of a cutting insert may be effected without a new adjustment of the wedge plate. The concept of an adjustable wedge plate situated between the base surface of the cutting insert and the seating surface of the wedge plate and the otherwise direct engagement of the lateral surfaces of the cutting insert with the seating surfaces of the tool body result in a high degree of repetitive accuracy upon tightening the cutting inserts.

Advantageously, both the cutting insert and the wedge plate are provided with an opening through which a single tightening screw passes. The tightening screw clamps the cutting insert against the wedge plate and also clamps the latter against the wedge plate seating surface. An adjustment of the wedge plate may be effected only after the tightening screw has been slightly loosened. If the screw is tightened, both the cutting insert and the wedge plate are firmly clamped.

The wedge plate seating surface is inclined preferably a few degrees (for example, 1° to 10°) to an imaginary reference surface to which the securing bore is oriented perpendicularly and which extends parallel to the base surface of the cutting insert. The acute angle corresponds to the wedge angle of the wedge plate whose shift results in a height adjustment of the cutting insert. The range of adjustment of the cutting insert is preferably between 20 and 30 micron. If required, however, larger or smaller adjustment ranges may be set.

The base surface of the cutting insert and the seating surface of the wedge plate are preferably planar. If required, however, they may be provided with a profile, such as ribs or grooves, extending parallel to the adjusting direction of the wedge plate. Similar considerations apply to the base surface of the wedge plate and the wedge plate seating surface of the tool body. Planar surfaces are preferred because of the resulting uniform pressure distribution.

The engagement surfaces serving for a lateral support of the cutting insert are preferably directly formed on the tool body. Such an arrangement results, on the one hand, in a very rigid support of the cutting inserts and, on the other hand, in a small distance between inserts and thus in a large number of teeth.

The wedge plate is shifted preferably in a direction which is oriented parallel to the cutting edge to be adjusted. In this manner particularly small cutting insert distances may be achieved. As setting devices for a specified adjustment of the wedge plate, for example, differential threaded screws may be used which are positioned with one thread in the wedge plate and with another thread in the tool body. In case of unlike thread pitches, turning of the screw results in a shift of the wedge plate. The direction of shift is preferably transverse to the cutting insert. It is to be understood that a simple securing screw may be used instead which, upon tightening, can shift the wedge plate only in one direction. In the two cases noted above, the respective screw extends longitudinally to the wedge plate. It is furthermore feasible to orient the screw transversely to the wedge plate and, for example, to provide the screw with an eccentric head which shifts the wedge plate.

Figure 2:
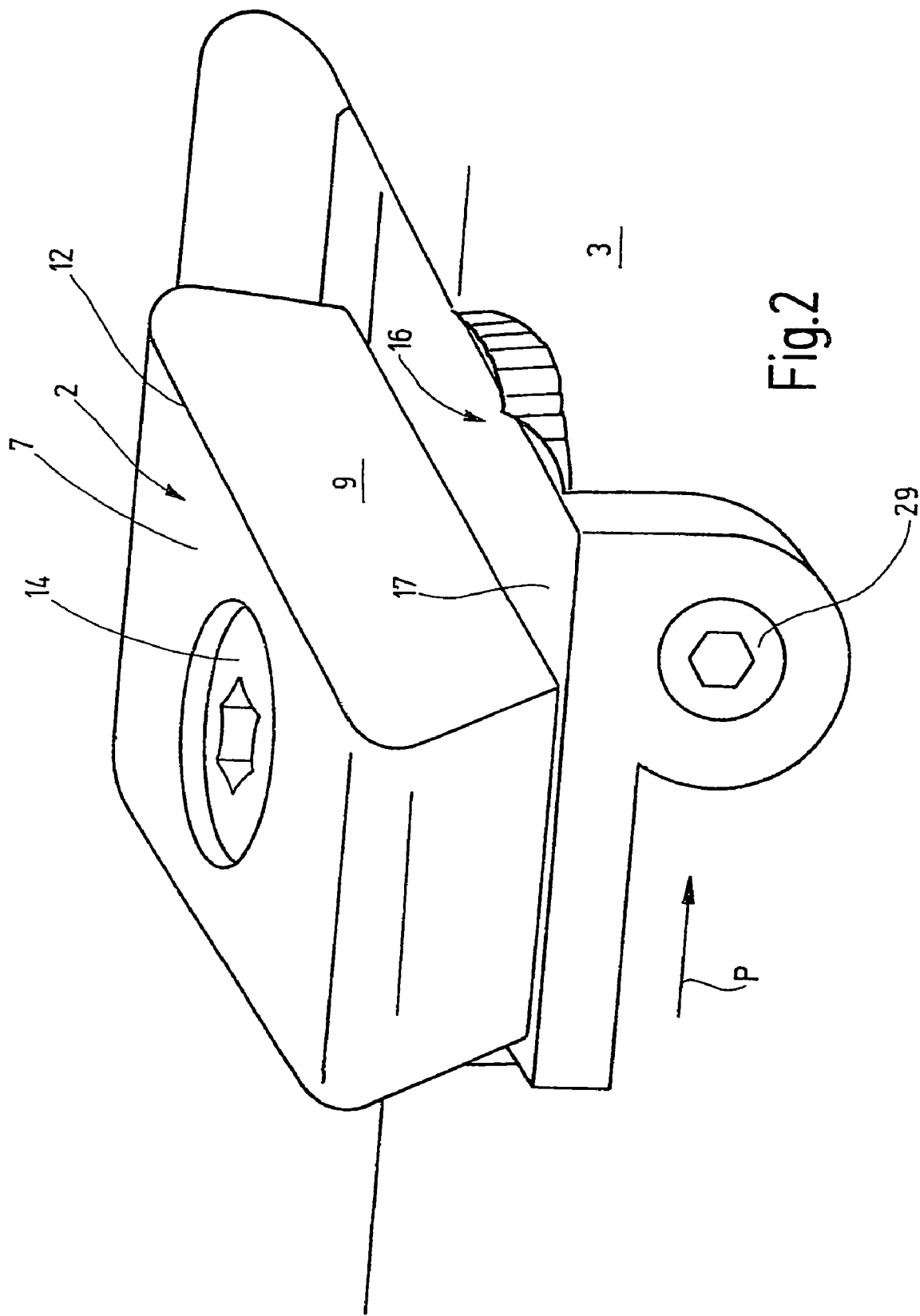
Figure 3:
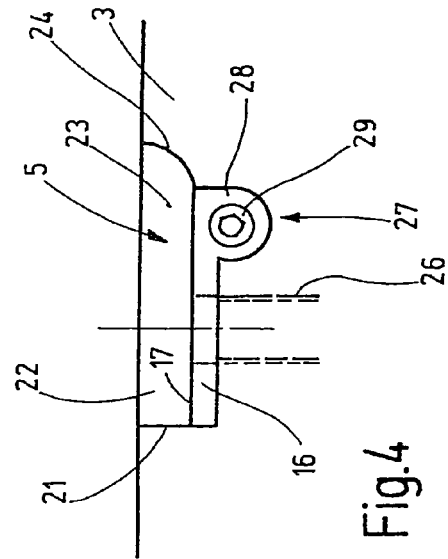
Figure 4:
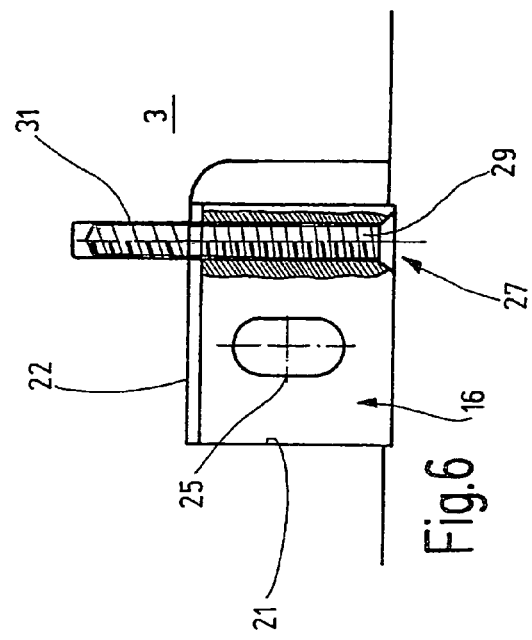
Figure 5:
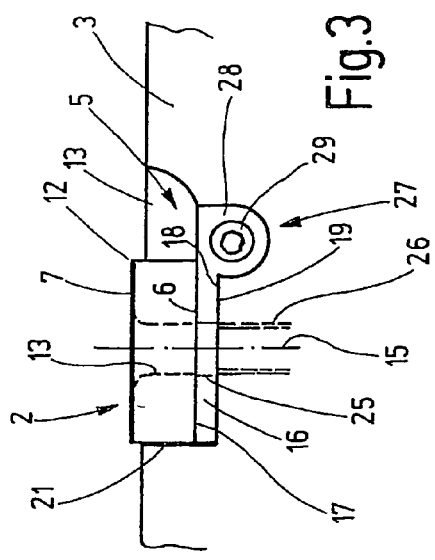
Figure 6:
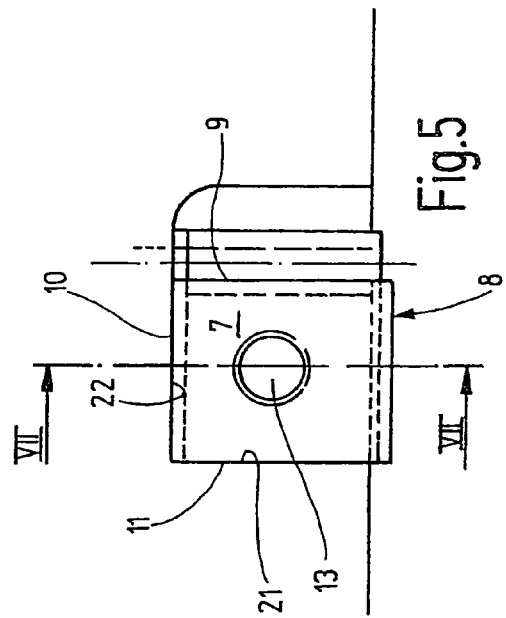
Figure 7:
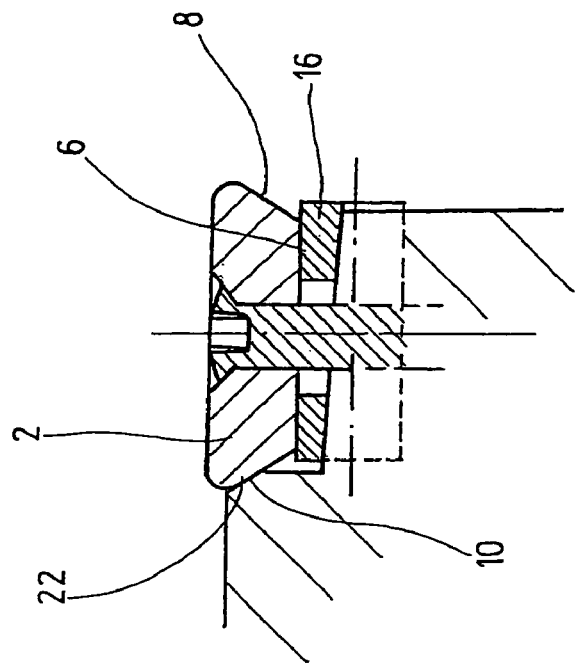
Figure 8:
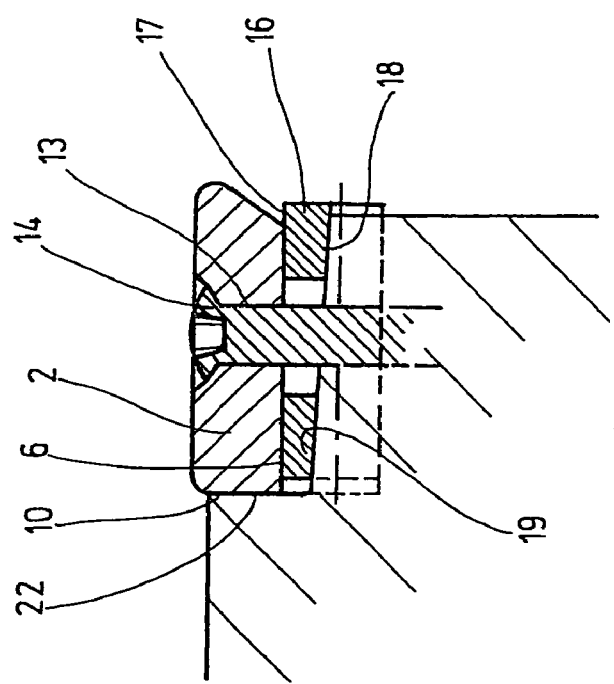
Figure 9:
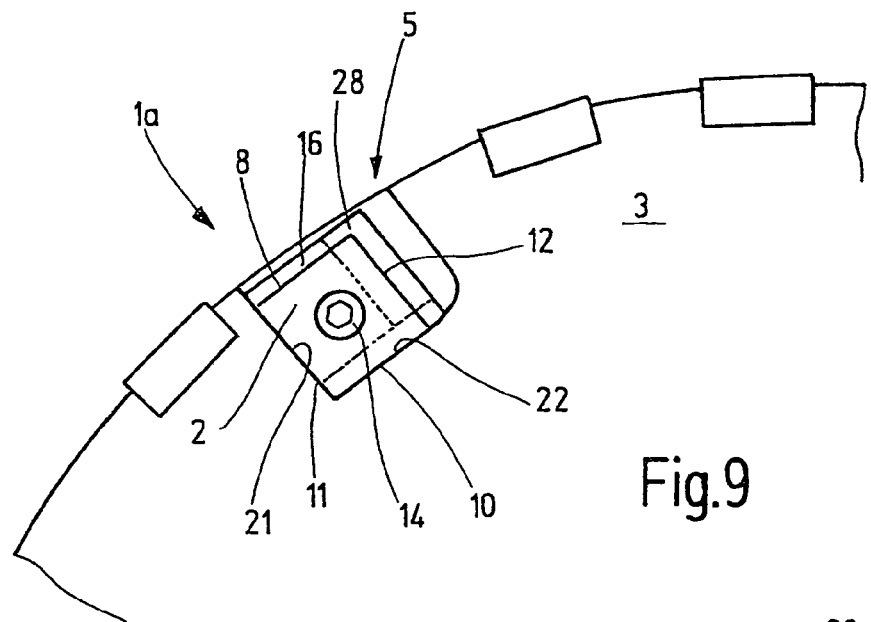
Figure 10:
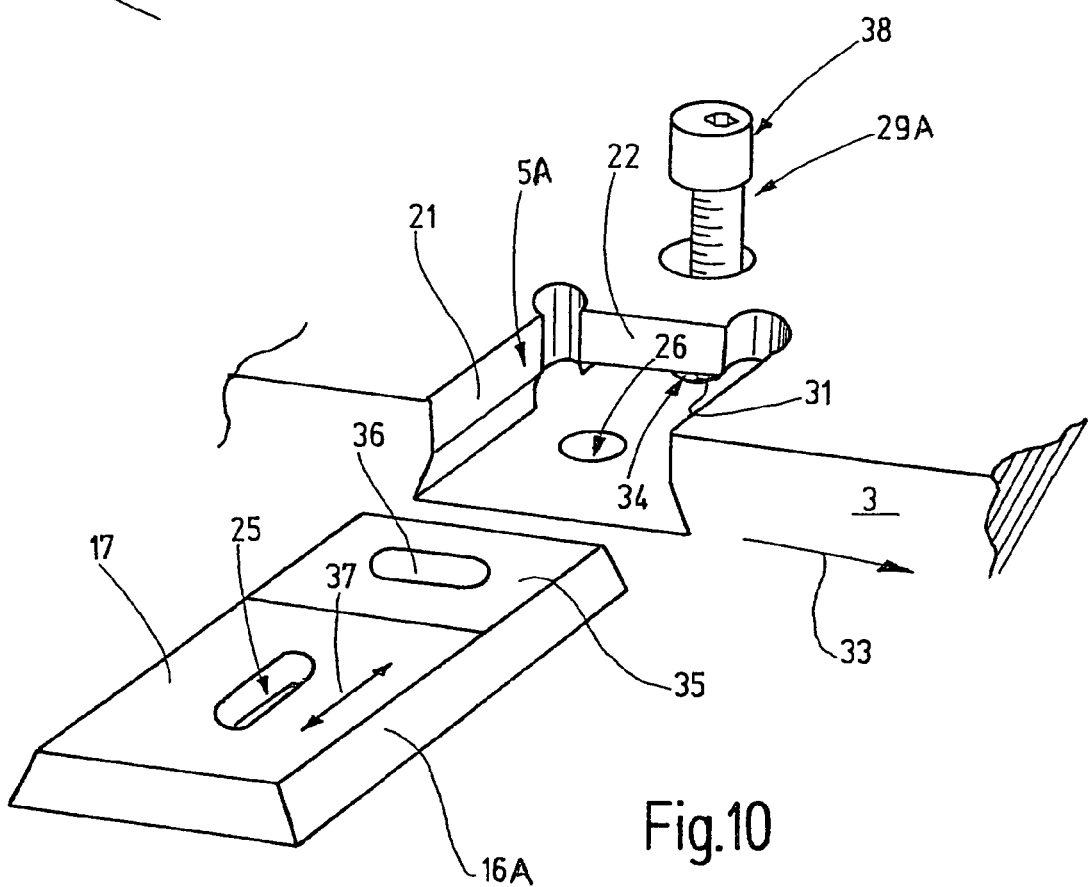

Further details of advantageous embodiments of the invention may be found in the drawing, the specification or claims. The drawing illustrates several embodiments of the invention, wherein:

FIG. 1 is a fragmentary perspective view of a milling tool having radially adjustable cutting inserts and a large number of teeth, FIG. 2 is a fragmentary perspective view of the milling tool of FIG. 1, shown on a different scale, FIG. 3 is a fragmentary side elevational view of the milling tool according to FIG. 1, FIG. 4 shows the milling tool of FIG. 3 without a cutting insert, FIG. 5 is a radial view of the milling tool shown in FIGS. 1 and 3, FIG. 6 is a partially sectional view of the milling tool of FIG. 5, shown without a cutting insert, FIG. 7 is a sectional view of the milling tool of FIG. 5, taken along line VII—VII, FIG. 8 is a modified embodiment of the milling tool shown in FIG. 7, FIG. 9 is a schematic front elevational view of a milling tool having an axially adjustable lateral insert, and FIG. 10 is a fragmentary exploded view of a modified embodiment of a milling tool having a wedge plate and an eccentric screw for adjusting the insert seat.

DESCRIPTION OF PREFERRED EMBODIMENTS OF THE INVENTION

FIG. 1 illustrates a milling tool 1 which is formed as a disk miller and which has a large number of tangentially arranged cutting inserts 2. The milling tool includes a disk-shaped tool body or base body 3 which is centrally provided with a securing device, such as a receiving bore 4 for accommodating a spindle. The cutting inserts 2 are arranged on the outer periphery of the tool body 3 in respective, identically structured insert seats 5 shown in FIGS. 2 to 6 to which reference will be made below. The illustrated cutting insert 2 has a base surface 6 (FIG. 3), a top surface 7 essentially parallel to the base surface 6 and side surfaces 8, 9, 10, 11 (FIG. 5). Between the side surface 9 and the top surface 7 a cutting edge 12 is formed which extends, for example, axially and whose radial distance from the axis of rotation is to be set. A securing bore 13 passes through the cutting insert 2 perpendicularly to the base surface 6 and the top surface 7 for receiving a securing screw 14 shown only as a dash-dot line 15 in FIG. 3.

Each insert seat 5 includes a recess having a wedge-plate seating surface 19. Disposed in the insert seat is a wedge plate 16 which has a preferably planar seating surface 17 facing the cutting insert 2. On the lower side of the wedge plate 16 a base surface 18 is formed which also is preferably planar and which lies against the wedge plate seating surface 19.

As will be explained hereafter, the wedge plate 16 is axially adjustable, i.e., in a direction of wedge adjustment extending parallel to the tool's axis of rotation, (a right-left direction in FIG. 7). Such axial adjustment of the of the wedge plate produces an adjustment of the insert in a direction of insert adjustment oriented perpendicular to the direction of wedge adjustment (i.e., radially with reference to the axis of rotation, due to the particular configuration of the wedge plate described below). When viewing the wedge plate 16 in a direction perpendicular to the direction of wedge adjustment (i.e., when viewing the wedge plate 16 in FIG. 7), it can be seen that the seating surface 17 and the base surface 18 together form an acute angle of a few degrees, for example 3° The seating surface 17 is oriented preferably perpendicularly to the axis of the securing bore 13, while the base surface 18 (and thus the wedge plate seating surface 19), defines an angle other than 90°(i.e., it defines an oblique angle) with the axis of the securing bore 13.

The wedge plate 16 is an overall flat plate whose thickness is less than the height of the cutting insert 2. The wedge plate 16 serves only to provide for a height-adjustable seating surface for the cutting insert 2. The wedge plate 16, as may be well observed particularly in FIG. 4, its seating surface 17 supports the base surface 6 of the insert, whereas engagement surfaces 21, 22 of the insert seat 5 support respective side surfaces of the insert. The wedge plate 16 and its seating surface 17 extend beyond the side surface 9 of the cutting insert 2, whereby the seating surface 17 forms the bottom of a chip space 23 which adjoins, preferably in a stepless manner, a curved surface 24 of the tool body 3.

The wedge plate 16 further has a throughgoing opening 25 formed as a slot as shown in FIG. 6. The long dimension of the opening 25 extends approximately parallel to the cutting edge 12, that is, parallel to the adjusting direction of the wedge plate 16. The securing screw 14 passes through the opening 25 and is screwed into a threaded bore 26 of the base body 3.

For performing a specified shifting or adjusting the wedge plate 16, a setting device 27 is provided which is arranged preferably underneath the chip space 23, that is, externally of a wedge plate region which is firmly clamped by the tightening screw 14. The setting device 27 comprises a tubular portion 28 which is an integral part of the wedge plate 16 and which is situated essentially externally of a region of the wedge plate covered by the cutting insert 2. Stated differently, the wedge plate seating surface 19 has essentially the same size as the base surface 6 of the cutting insert 2. As viewed in the tool's direction of rotation, indicated by the arrow P, disposed ahead of the wedge plate seating surface 19 is a groove-like recess which receives the tubular portion 28 with only a small play. Further, a setscrew 29 is held in the portion 28 which, for this purpose, is provided with a bore, for example, a threaded bore. In alignment with such a bore a further threaded bore 31 is formed in the tool body 3 for receiving the setscrew 29. The thread in the portion 28 and the thread provided in the bore 31 preferably have different pitches. Likewise, the setscrew 29 has two threads whose pitches correspond to the pitches in portion 28 and the bore 31, respectively. A rotation of the setscrew 29 thus effects an axial displacement of the wedge plate 16.

A setting of the radial position of the cutting edge 12 and thus the radial setting of the cutting inserts 2 is effected as follows.

After providing the base body 3 with the cutting inserts 2, the securing screws 14 are first slightly (that is, not too firmly) tightened. Thereafter the base body 3 is received in a measuring device, and the cutting inserts 2 are consecutively set as follows. The cutting edge 12 is sensed and its distance from the rotary axis determined. If such a distance deviates from a desired value, the setscrew 29 is turned in the appropriate direction for axially shifting the wedge plate 16 relative to the cutting insert 2 and the base body 3. Shifting the wedge plate 16 to the left as viewed in FIG. 7 adjusts the insert radially outwardly, resulting in an enlargement of the cutting radius, whereas shifting the wedge plate 16 to the right as viewed in FIG. 7 causes a reduction of the cutting radius. When the desired value is reached, the securing screw 14 is firmly tightened. This process is repeated for each cutting insert 2 until the required accurate positioning of the cutting edges is reached, whereupon the milling tool 1 is ready for use. As may be seen in FIG. 1, the milling tool 1 is capable of a high chip breaking performance due to the small distances between the cutting inserts 2. The distances between the cutting inserts 2 are less than the length of one cutting insert. The distances are determined solely by the size of the required chip spaces 23 and the minimum width of the cleats 32 which are formed on the base body 3 and which carry the engagement surfaces 21. Thus, between two cutting inserts 2 there are situated only one chip space 23 and one cleat 32.

The cutting inserts 2 are replaceably supported. For a replacement, merely the securing screws 14 need to be removed, whereupon the cutting inserts 2 may be exchanged. In case of a sufficiently accurate manufacture of the cutting inserts (for example, if they originate from the same batch), no new adjustment is necessary. In case the cutting inserts 2 are of the invertible type as shown in FIG. 8, their inversion is feasible without a new adjustment of the respective wedge plate 16. The cutting insert 2 of FIG. 8 is an invertible cutting insert, whose lateral surfaces 8, 10 have an identical inclination to the base surface 6. The individual insert seats are radially adjusted after providing the base body 3 with the cutting inserts 2, so that all cutting edges lie on the same diameter. In case the cutting edges are worn down, the securing screws 14 are released, and each cutting insert 2 is inverted in its seat and again tightened. A new adjustment is not needed, even if the individual cutting inserts 2 could not be replaced among one another without a new adjustment due to their manufacturing tolerances.

According to a simplified embodiment of the milling tool 1, instead of the setscrew 29 having unlike threads (FIG. 6), a setscrew with only a single thread could be provided which passes through the tubular portion 28 with "play" and which is screwed into the threaded bore 31. By tightening such a setscrew, an adjustment of the wedge plate 16 may be effected in one direction and such adjustment ends upon reaching the desired magnitude. A backward motion of the wedge plate 16 is possible only by fully releasing the securing screw 14 and by manually pushing back the wedge plate 16. Such a simplified embodiment would be sufficient for almost all applications.

The present invention can also be employed to effect an axial adjustment of a cutting insert disposed on an end face of a milling tool. In that regard, FIG. 9 illustrates a milling tool 1a where a cutting insert 2 formed as an axially adjustable lateral insert is provided. The insert seat 5 provided for such a cutting insert is disposed at the flat side (end face) of the base body 3. The seat includes a wedge plate 16 for adjusting the height position (in this case the axial position) of the cutting insert 2. In other aspects, reference is made to the foregoing description and the same reference numerals.

According to the earlier described embodiments the wedge plate 16 was adjusted by a setscrew 29 extending essentially parallel to the wedge and situated adjacent the wedge portion of the wedge plate. Alternatively, a setting device may be arranged in alignment ahead of or behind the wedge portion of the wedge plate 16. According to the embodiment shown in FIG. 10, where parts or elements which are structurally or functionally identical to those as described earlier, are provided with the same reference numerals, the wedge plate 16A is configured for a dovetail-type guidance. The direction of the thickness increase is again oriented transversely to the direction of motion and the cutting edge of the cutting insert (not shown). The direction of motion determined by the rotation of the base body 3 is indicated by an arrow 33 in FIG. 10. In the base body 3, next to the dovetail shaped insert seat 5A proper, a well 34 is formed into which projects an extension 35 of the wedge plate 16. The extension 35, which undercuts the lateral engagement surface 22, is provided with a slot 36 oriented transversely to the adjusting direction 37 of the wedge. The slot 36 is associated with a setscrew 29A provided with an eccentric head 38. In the installed state the eccentric head 38 sits in the slot 36 and has a diameter which corresponds to the width of the slot 36 measured in the adjusting direction 37. Turning the setscrew 29 thus causes a longitudinal adjustment of the wedge plate 16 in the direction 37 and thus a height adjustment of the seating surface 17. The radial or axial position of the cutting insert is accordingly changed, dependent on whether the cutting insert is used as a tangential insert or a lateral insert.

In accordance with the invention there is provided a milling tool of good precision having a large number of teeth, includes insert seats 5, 5A whose seating surface 17 is formed on a wedge plate 16, 16A. The wedge plate is adjustable within the insert seat with respect to the tool body 3 and the cutting insert 2. A securing screw 14 passes through the cutting insert 2 and the wedge plate and clamps them both against the tool body 3. A setscrew 29, 29A serves for a specified adjustment of the wedge plate and thus for a height adjustment of the cutting insert 2 and its cutting edge 12.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A milling tool comprising:
    a tool body in combination with at least one cutting insert mounted thereon, the tool body defining an axis of rotation and including at least one insert seat on which the at least one insert is mounted, the at least one insert seat including a wedge-plate seating surface;
    a wedge plate disposed in the at least one insert seat and being adjustable relative to the body in a direction of wedge adjustment, the wedge plate including:
        a base surface movably disposed on the wedge-plate seating surface, and
        an insert seating surface on which the at least one insert is supported, the base surface and the insert seating surface forming an acute angle therebetween as viewed in a direction perpendicular to the direction of wedge adjustment; and
    a setting device operably engaging the wedge plate and arranged to move the wedge plate in the direction of wedge adjustment relative to both the insert and the wedge-plate seating surface for adjusting the insert in a direction of insert adjustment oriented substantially perpendicularly to the direction of wedge adjustment,
    wherein the wedge-plate seating surface includes a threaded hole therein; the at least one insert includes a securing bore extending therethrough in alignment with the threaded hole; the wedge plate including a through-hole aligned with the securing bore and the threaded hole; and an insert fastener extending through the securing bore and the through-hole and secured in the threaded hole.

2. The milling tool according to claim 1 wherein the through-hole in the wedge plate is wider than the threaded hole in the direction of wedge adjustment.

3. The milling tool according to claim 1 wherein the at least one insert includes a planar base surface seated on the insert seating surface which is planar.

4. The milling tool according to claim 1 wherein the base surface of the wedge plate and the wedge-plate seating surface are planar.

5. The milling tool according to claim 1 wherein the acute angle is in the range of 1° to 10°.

6. The milling tool according to claim 1 wherein the at least one seat includes at least one engagement surface for engaging a side surface of the at least one insert.

7. The milling tool according to claim 1 wherein the setting device includes a rotary member having an eccentric head disposed in a slot formed in the wedge plate.

8. The milling tool according to claim 1 wherein the direction of wedge adjustment extends parallel to the axis of rotation.

9. The milling tool according to claim 1 wherein the direction of wedge adjustment extends perpendicular to the axis of rotation.

10. The milling tool according to claim 1 wherein the setting device extends through the wedge plate.

11. The milling tool according to claim 10 wherein the setting device comprises a setscrew passing through a tubular portion of the wedge plate and is received in the tool body.

12. The milling tool according to claim 10 wherein the setting device comprises a setscrew threadedly connected to the wedge plate by a first thread and threadedly connected to the tool body by a second thread having a different pitch than the first thread, the setscrew extending in the direction of wedge adjustment.

13. A milling tool comprising:
    a tool body defining an axis of rotation and including at least one insert seat adapted to support a cutting insert, the at least one insert seat including a wedge-plate seating surface having a threaded hole formed therein adapted to accommodate a threaded insert fastener,
    a wedge plate disposed on the at least one insert seat and being adjustable relative to the body in a direction of wedge adjustment;
        the wedge plate including a base surface movably disposed on the wedge-plate seating surface, and an insert seating surface adapted for supporting a cutting insert thereon, the wedge plate having a through-hole formed therein and extending through the base surface and the insert seating surface, the through-hole being aligned with the threaded hole and being wider than the threaded hole in the direction of wedge adjustment, the base surface and the insert seating surface forming an acute angle therebetween as viewed in a direction perpendicular to the direction of wedge adjustment; and
    a setting device operably engaging the wedge plate and arranged to move the wedge plate relative to the wedge-plate seating surface in the direction of wedge adjustment.

14. The milling tool according to claim 13 wherein the setting device includes a rotary member having an eccentric head disposed in a slot formed in the wedge plate.

15. The milling tool according to claim 13 wherein the direction of wedge adjustment extends parallel to the axis of rotation.

16. The milling tool according to claim 13 wherein the direction of wedge adjustment extends perpendicular to the axis of rotation.

17. The milling tool according to claim 13 wherein the acute angle is in the range of 1° to 10°.

18. The milling tool according to claim 17 wherein the setting device includes a rotary member having an eccentric head disposed in a slot formed in the wedge plate.

* * * * *